United States Patent

[11] 3,583,766

[72] Inventor Louis R. Padberg, Jr.
 22 Rincon Vista, Santa Barbara, Calif. 93103
[21] Appl. No. 826,945
[22] Filed May 22, 1969
[45] Patented June 8, 1971

[54] APPARATUS FOR FACILITATING THE EXTRACTION OF MINERALS FROM THE OCEAN FLOOR
 6 Claims, 4 Drawing Figs.
[52] U.S. Cl. .................................................. 299/14,
 175/2, 175/6, 175/16, 340/12
[51] Int. Cl. ...................................................... E21c 37/18
[50] Field of Search ........................................... 299/13, 14,
 16; 175/2, 4.5, 5, 6; 340/12; 181/.5

[56] References Cited
UNITED STATES PATENTS
| 2,799,488 | 7/1957 | Mandt | 299/13 |
|---|---|---|---|
| 3,219,280 | 11/1965 | Seldenrath et al. | 299/14X |
| 3,332,510 | 7/1967 | Clark | 340/12X |

Primary Examiner—Ernest R. Purser
Attorneys—Edgar J. Brower, Q. Baxter Warner and Joward J. Murray, Jr.

ABSTRACT: A method and apparatus for facilitating the extraction of valuable minerals which have settled and solidified to form a hard layer covering the floor of the ocean. The invention is based upon the employment of a high-intensity shock wave to break up the solidified material so that it may readily be brought to the surface by dredging or other conventional means. In a preferred embodiment, the shock wave is produced by creating plasma discharge between two electrodes immersed in sea water, these electrodes having been inserted into an opening formed in the material to be extracted.

PATENTED JUN 8 1971 3,583,766

APPARATUS FOR FACILITATING THE EXTRACTION OF MINERALS FROM THE OCEAN FLOOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

It has long been known that valuable minerals, such for example as manganese, occur in great abundance in many places on the floor of the ocean and on the sides of sea mounts. These minerals have been deposited over long periods of time by settling and solidification, as a result of which they are almost rocklike in character and hence difficult to extract by ordinary methods.

Attempts have been made to break up these deposits by chemical explosives such as TNT. Although such expedients do result in fracturing the deposits to a degree, they are also hazardous to many forms of marine life, and their use has been strongly opposed both by the fishing industry and by conservationists interested in protecting the earth's natural resources.

SUMMARY OF THE INVENTION

It has been found that this breaking up, or fracturing, process may be more efficiently carried out and with minimum danger to see life by generating high-intensity acoustic energy in the form of sharp pressure waves which are controllable both as to frequency and direction in accordance with the environmental characteristics of the region where the operation is performed. In a preferred embodiment, a standard type of ocean floor drill may be utilized to make an opening in the mineral deposit of interest. In a tube above the drill may be located an assembly consisting of a pair of electrodes between which extends a thin wire composed of some material such as nickel. When a high current is suddenly applied between the electrodes, the wire vaporizes to create a plasma discharge accompanied by sharp pressure waves. These pressure waves pass out of the tube through openings so configured as to focus the energy into the mineral deposit to break up the latter. The resulting small pieces of mineral matter may then readily be dredged or otherwise brought to the surface.

OBJECTS OF THE INVENTION

One object of the present invention, therefore, is to provide an improved method and means for dislodging mineral deposits from the floor of the ocean or other large body of water.

A further object of the invention is to provide means for dislodging minerals from the floor of the ocean through the electrical generation of shock waves having a level of intensity comparable to that obtainable from the use of chemical explosives.

An additional object of the invention is to provide means for creating a plasma discharge underwater and for directing the resulting shock waves into a solid mass of mineral deposits to break up the latter so that the resulting small pieces may be more readily brought to the surface.

Other objects, advantages, and novel features of the invention will become apparent from the following detailed description of the invention when considered in conjunction with the accompanying drawings.

DESCRIPTION OF THE PREFERRED EMBODIMENT

Figure 1:
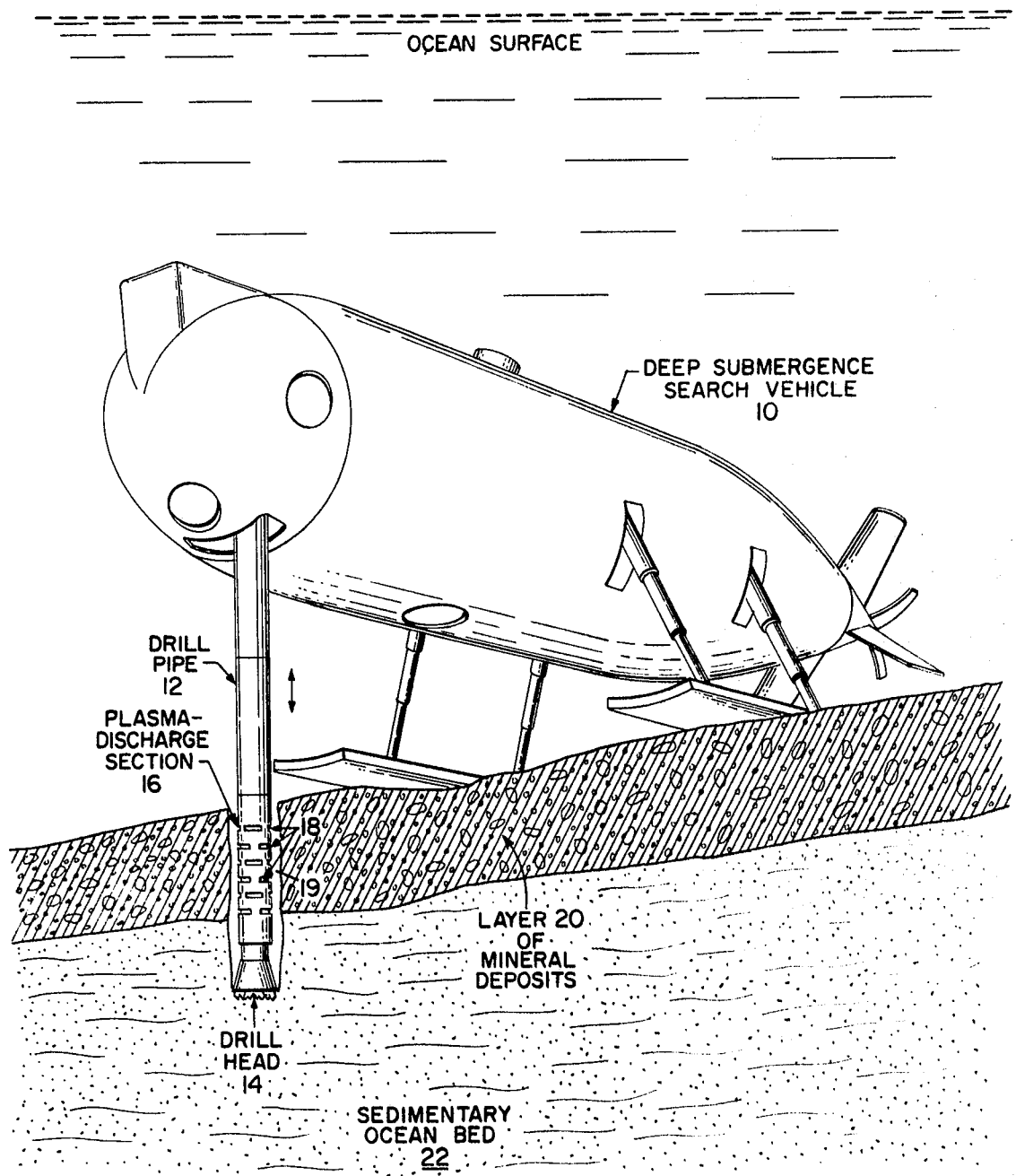
FIG. 1 is a schematic view, partly in section, of a preferred embodiment of the present invention, also showing one manner in which the mineral-fracturing process may be carried out.

In FIG. 1 of the drawings is shown one form of apparatus embodying the principles of the present concept. Inasmuch as the invention contemplates the creation of a plasma discharge into the material to be fractured, there is illustrated one manner in which this objective may be achieved. An underwater vehicle 10, which may be any suitable submersible such for example as an Ocean Work Submarine or a DSSV (Deep Submergence Search Vehicle) capable of remaining relatively motionless below the surface, is provided with a length of pipe 12 terminating in a drill head 14, the pipe 12 extending vertically downwardly as set forth in the drawing and being capable of extension and retraction from and into the vehicle 10 by any suitable conventional mechanism (not shown). As an alternative, the pipe 12 may be lowered from an ocean coring or drilling vessel of the type employed in exploratory operations by the petroleum industry. The particular method and/or means selected to raise and lower the pipe 12 forms no part of the present invention, however, and the choice of apparatus employed will depend not only on the depth at which the fracturing process herein described is to be performed, but also upon the nature of the mineral deposit the extraction of which is desired.

Figure 2:
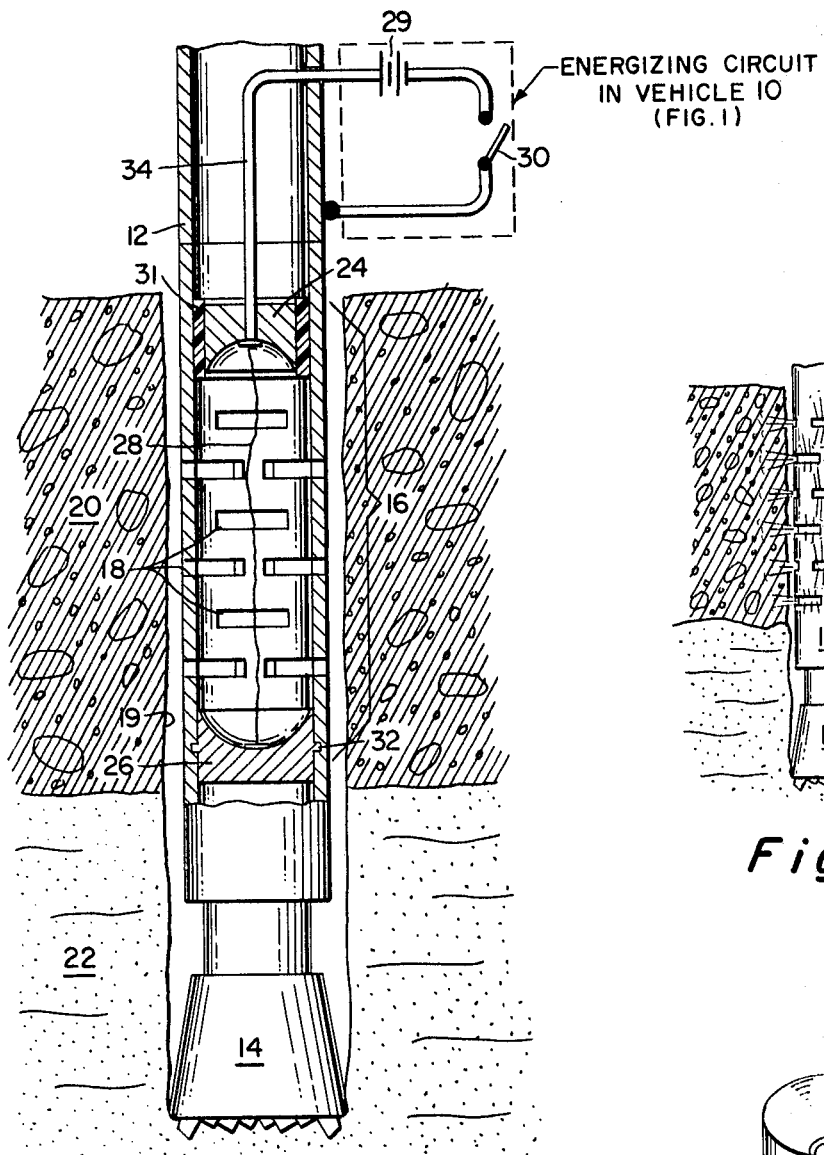
FIG. 2 is an enlarged view, partly in section, of a portion of FIG. 1, illustrating the electrical connections to the electrodes between which a plasma discharge is created.

Above the drill head 14, the drill pipe 12 is modified to include a plasma discharge section 16 shown in greater detail in FIG. 2 of the drawings. Although the interior assembly of this section will be described hereinafter, it might be mentioned at this point that the outer wall thereof is slotted or otherwise provided with a plurality of vertically spaced openings 18 extending part way around the circumference of the pipe section, and preferably offset from one another as illustrated. These openings 18 are provided for the purpose of permitting shock waves generated within the section 16 to emerge therefrom, and hence their number, size and configuration are matters of choice. The openings 18 may also be formed at an angle with the axis of the pipe 12 so as to have a directive effect on any pressure waves passing therethrough, if such an expedient is found to be desirable.

Referring again to FIG. 1, the pipe 12 is lowered from the vehicle 10 so that the drill head 14 forms a pilot hole 19 extending a distance of approximately 6 feet (for example) into the ocean floor, the depth of this hole being such that the pipe section 16 lies within the upper and lower boundaries of a layer 20 of mineral deposits the extraction of which is desired. This mineral layer 20 overlies the sedimentary ocean bed 22. The openings 18 in the pipe section 16 are thus brought into a position where they directly face the material to be fractured.

The present concept now contemplates the production of a plasma discharge within the pipe section 16. This discharge is created by means fully described in applicant's U.S. Pat. No. 3,364,708 issued Jan. 23, 1968 and entitled "Electrical Discharge Method of and Apparatus for Generating Shock Waves in Water." In this patent is set forth means for discharging electrical energy through a predetermined path in water and with such a high level of intensity and rapid rate of discharge as to generate a rapidly expanding and collapsing gas bubble with accompanying shock waves simulating those receivable from explosives. Although the principles underlying the concept of the patent will not be repeated herein, it might be said that when extremely high potentials are applied across an electrode gap immersed in an electrically conducting fluid such as sea water, the ensuing electrical discharge across the gap causes a sudden increase in in temperature of the order of thousands of degrees Fahrenheit. The water vaporizes to form a gaseous bubble, the latter expanding and collapsing, whereupon another bubble forms, expands and collapses. This process continues as long as the electrical potential is applied to the electrodes at a critical level. The alternate bubble expansion and collapse causes a propagation of acoustic waves in the form of sharp pressure pulses having a steep wave front.

Figure 4:
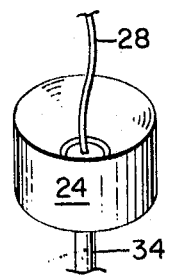
FIG. 4 is an enlarged view of one of the electrodes of FIG. 2.

Referring now to FIG. 2 of the drawings, there is illustrated a pair of electrodes 24 and 26, each of cup-shaped configuration and so disposed in spaced-apart relation within pipe section 16 as to face one another. The spacing of these electrodes 24 and 26 is such as to embrace all of the pipe openings 18 therebetween. As viewed in FIG. 2, the electrode 24 is in a sense inverted, while the electrode 26 is upright. Each of the electrodes 24 and 26 is composed of electrically conductive material, and is formed with a central contact area at the bottom of the cup for respective attachment thereto of one end of a thin wire 28 composed of some material, such as nickel, which will explode when a high current is suddenly passed therethrough, as from the power source 29 when the manually operable switch 30 is closed. However, in practice, the power-generating arrangement of U.S. Pat. No. 3,364,708 constitutes a more feasible system for this purpose. FIG. 4 of the drawings brings out the relationship between wire 28 and electrode 24.

Figure 3:
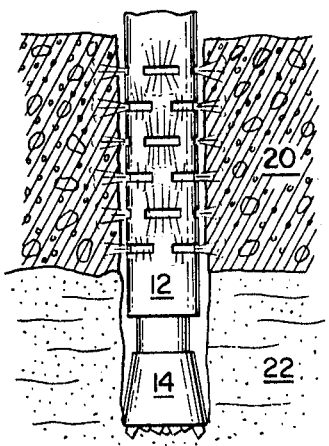
FIG. 3 illustrates the effect of creating such a plasma discharge.

In order to supply such current to the wire 28, the electrode 24 is electrically insulated from the pipe 12 by a collar 31 of some suitable material such as rubber or plastic, while the electrode 26 is formed with a flanged portion 32 extending into the inner wall of pipe 12 as shown. The pipe 12 forms the negative or ground end of an electrical circuit (such as shown, for example, in FIG. 3 of U.S. Pat. No. 3,364,708) while electrode 24 is connected to the positive terminal of such circuit by means of the conductor 34.

With the pipe 12 being as shown in FIG. 1 so that the openings 18 in section 16 face the wall of the opening in the mineral deposit 20, sudden passage of high current through wire 28 will cause the latter to explode, creating a large plasma discharge accompanied by shock waves. This action is illustrated schematically in FIG. 3 of the drawings. The shock waves are effective in fracturing the mineral deposit 20 in the vicinity of the opening 19, so that the material thus broken up may subsequently be brought to the surface by some conventional me such as dredging.

Where small deposits of minerals are involved, the above-described "one-shot" system is entirely satisfactory. It is also within the scope of the present concept to employ a number of electrode-wire assemblies of the type shown, spaced axially from one another and capable of independent energization to allow for fast, sequential firing without raising the drill head 14 from its point of maximum penetration into the ocean bed.

I claim:

1. Apparatus for facilitating the extraction of solidified minerals from the floor of the ocean or other body of water, said apparatus comprising:
   means for forming an opening in a solidified mass of minerals to be extracted;
   a selectively energizable source of pressure waves including a pair of electrodes;
   means for inserting said source of pressure waves into said opening; and
   means, including means for producing a plasma discharge between said pair of electrodes, for selectively energizing said source to produce pressure waves,
   said waves acting to break up the solidified mineral mass in the vicinity of said opening so that the subsequent extraction of said minerals is facilitated.

2. Apparatus according to claim 1, in which said means for producing a plasma discharge between said electrodes includes an explodable wire interconnecting said electrodes and extending therebetween.

3. Apparatus according to claim 2, in which said means for forming an opening in a solidified mass of minerals to be extracted includes a vertically positioned drill pipe having a drill head on the lower end thereof.

4. Apparatus according to claim 3, in which said pair of electrodes are located within said drill pipe, the latter having a plurality of side openings therein in the region occupied by said electrodes.

5. Apparatus according to claim 4, in which one of said pair of electrodes is electrically connected to said drill pipe, so that the latter forms part of said means for producing a plasma discharge between said electrodes.

6. Apparatus according to claim 5, in which each of said pair of electrodes is essentially cup-shaped, the two electrodes being disposed in face-to-face relationship within said drill pipe, and with the said explodable wire extending between points within the respective electrode cup portions.